United States Patent [19]

Yoshimaru et al.

[11] 4,298,269

[45] Nov. 3, 1981

[54] RECORDABLE READER PRINTER AND ELECTROSTATIC COPIER

[75] Inventors: Tomohisa Yoshimaru; Yasuhiro Sato, both of Yokohama; Mitsuo Yamashita, Tokyo, all of Japan

[73] Assignee: Tokyo Shibaura Denki Kabushiki Kaisha, Kawasaki, Japan

[21] Appl. No.: 76,728

[22] Filed: Sep. 18, 1979

[30] Foreign Application Priority Data

Sep. 22, 1978 [JP] Japan ................... 53-117045

[51] Int. Cl.³ ........................... G03G 15/00
[52] U.S. Cl. ..................... 355/3 R; 346/160; 355/8; 355/14 R
[58] Field of Search ............ 355/3 R, 8, 14 R; 346/160

[56] References Cited

U.S. PATENT DOCUMENTS

| | | | |
|---|---|---|---|
| 3,530,441 | 9/1970 | Ovshinsky | 346/160 X |
| 3,597,071 | 7/1971 | Jones | 346/160 X |
| 3,749,833 | 7/1973 | Rait et al. | 346/160 X |
| 4,166,691 | 9/1979 | Ebi et al. | 355/11 |

*Primary Examiner*—Fred L. Braun
*Attorney, Agent, or Firm*—Cushman, Darby & Cushman

[57] ABSTRACT

A recordable reader printer including a electrographic printer and a video tape recorder. The image on a document is converted into a video signal by a scanner. The video signal is recorded in a video tape by a recording head and the recorded video signal is reproduced by a reproducing head and supplied to the electrographic printer to reproduce the document image on a copy sheet.

6 Claims, 6 Drawing Figures

RECORDABLE READER PRINTER AND ELECTROSTATIC COPIER

BACKGROUND OF THE INVENTION

This invention relates to a recordable reader printer capable of recording, reproducing and printing information on a document.

Recently has been developed a recordable reader printer using a magnetic tape, in place of a microfilm reader printer. According to such a recordable reader printer, an image of a document is picked up by photoelectric conversion, and the picked document image information is recorded in the magnetic tape. Recorded document image information corresponding to a plurality of documents are read out and visualized electrographically as required. In checking to see if the document image is recorded properly in the magnetic tape by means of the prior art recordable reader printer, a detection code is keyed into the recorder printer through a keyboard after completion of the recording, and a document image information corresponding to such detection code is detected. When the document image information is detected, it is read out from the magnetic tape, and visualized by an electrographic printer. The quality of the recorded information is examined by watching the obtained visual image or the image on a copy sheet. Such a conventional recordable reader printer, however, requires separate operations for the recording and the reading for checking, so that the recording operation is rather troublesome.

SUMMARY OF THE INVENTION

Accordingly, the object of this invention is to provide a recordable reader printer capable of easy recording and recording check.

According to this invention, there is provided a recordable reader printer in which document image information is read out while it is being recorded, and the read document image information is reproduced on a copy sheet.

DETAILED DESCRIPTION OF THE PREFERRED EMBODIMENT

Figure 1:
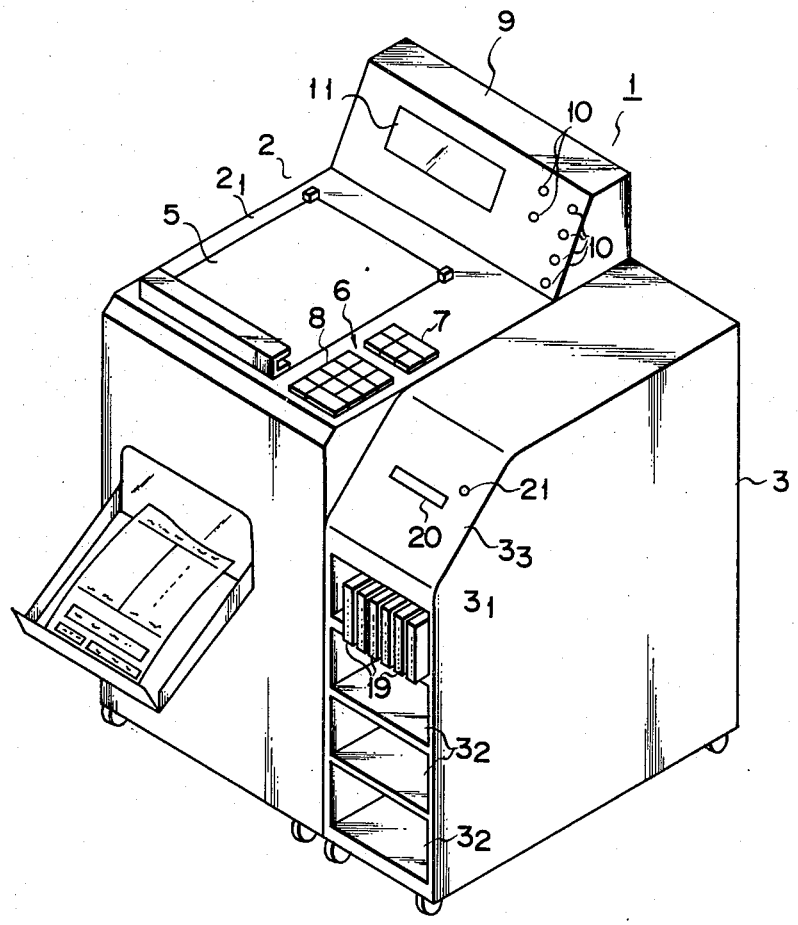
FIG. 1 is a perspective view of a recordable reader printer according to an embodiment of this invention.
Figure 2:
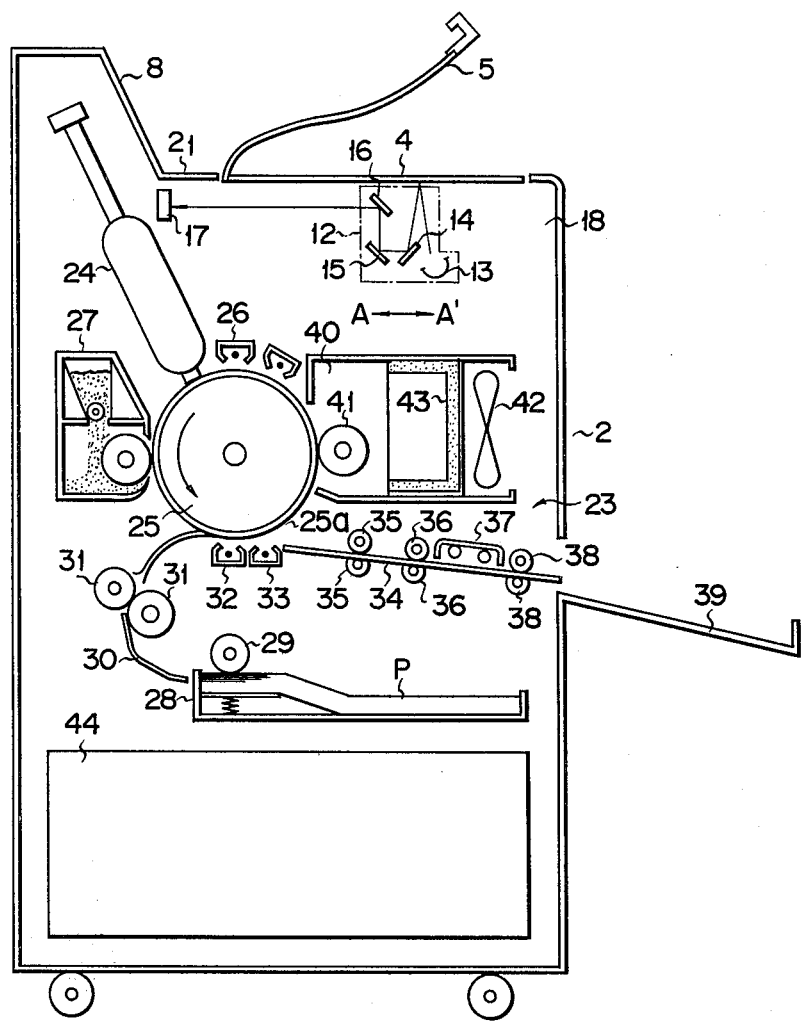
FIG. 2 shows the internal structure of a main body of the reader printer of FIG. 1.

As shown in FIG. 1, a recordable reader printer 1 of this invention is composed of a main body 2 and a subsidiary body 3. On a top face $2_1$ of the main body 2, as shown in FIG. 2, is a document table 4 to bear a document (not shown). The table 4 is fitted with a cover 5 for fixing the document on the table 4. Further on the top face $2_1$ of the main body 2 is a keyboard 6 having an operation key 7 and a ten-key 8. At the backward portion of the top of the main body 2 is a display section 9 having an inclined display surface. The display section 9 is provided with a plurality of indicating lamps 10 severally indicating the operating states of the operation key 7 and a digital display unit 11 displaying the register state of the ten-key 8.

A reciprocative optical system 12 is arranged at a portion inside the main body 2 which corresponds to the document table 4. The optical system 12 includes a halogen lamp 13 for the illumination of the document through the document table 4 and mirrors 14, 15 and 16 to deflect reflected light from the document. The light deflected by these mirrors falls on a photoelectric conversion element, e.g. a solid state image pickup element 17 such as CCD (charge coupled device). The solid state image pickup element 17 converts the reflected light from the document into a video signal corresponding to a document image. Namely, the optical system and the image pickup element constitute a scanner 18.

At a front portion $3_1$ of the subsidiary body 3 is a multistage tape cassette receiving chamber $3_2$ to store video tape cassettes 19. On a slanting surface at the top of the front portion of the subsidiary body 3 are a tape cassette slot 20 to hold one of the tape cassettes 19 and a check lamp 21 which lights up when a recording/reproducing device, e.g. a video tape recorder (VTR) 22 as shown in FIG. 3, is set properly.

As shown in FIG. 2, inside the main body 1 is a rotatably mounted photoconductive drum 25 around which a corona charger 26 for charging the photoconductive drum, optical fiber cathode-ray tube 24 for exposure, magnetic brush device 27 for development, charger 32 for transferring the developed toner, charger 33 for exfoliation, and a cleaning device 40 are arranged successively in the rotating direction of the drum. Below the chargers 32 and 33, there is disposed a sheet cassette 28 is which copy sheets P are contained. In close vicinity to the sheet cassette 28 exist a feed roller 29, and a sheet path 30 and carrier rollers 31 to carry each copy sheet P delivered from the feed roller 29 between the photoconductive drum 25 and the transfer charger 32. Further provided are a sheet path 34 and carrier rollers 35 and 36 to carry the copy sheet P torn off the photoconductive drum 25 by the exfoliation charger 33 into a fixer 37. Moreover, there is provided a discharge roller 38 to discharge the fixed copy sheet P into a tray 39. The cleaning device 40 has a fur brush 41 located near the surface of the photoconductive drum 25 and a fan 42 to cause toner removed from the drum 25 by the fur brush 41 to be attracted by a filter 43.

Figure 3:
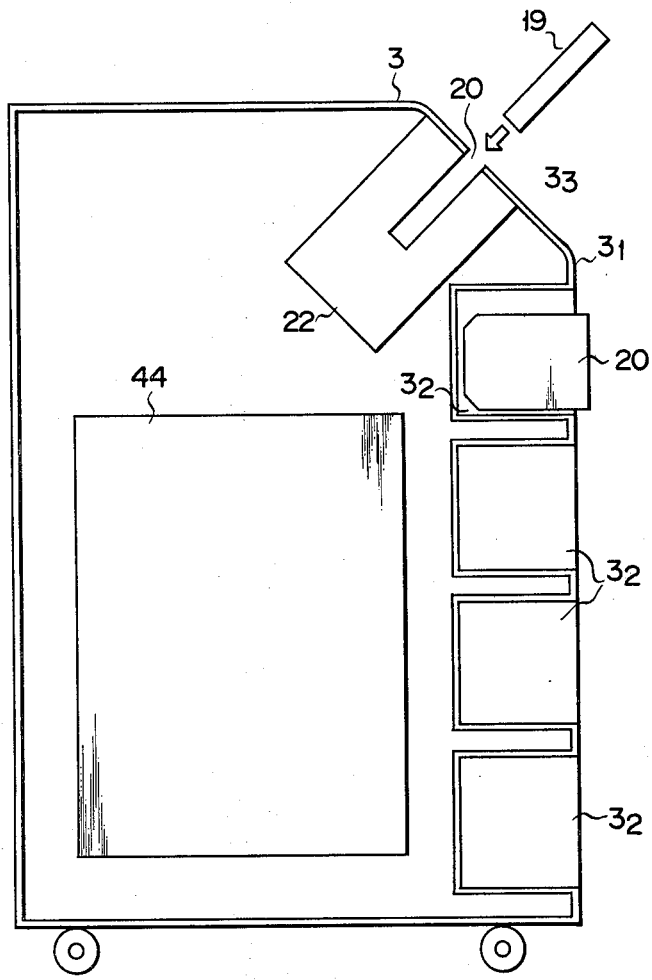
FIG. 3 shows the internal structure of a subsidiary body of the reader printer of FIG. 1.
Figure 4:
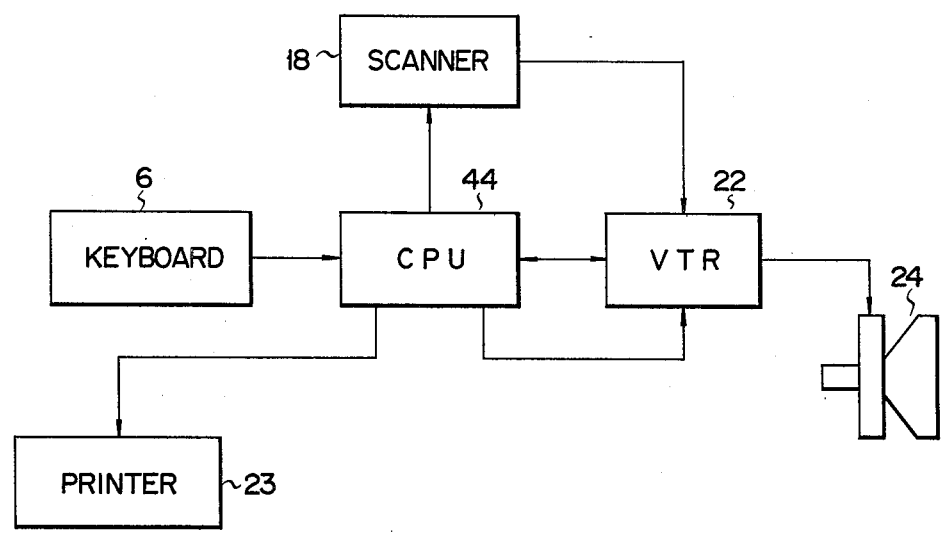
FIG. 4 is a block diagram of the reader printer of FIG. 1.

The main and subsidiary bodies 2 and 3, as shown in FIGS. 2 and 3, are provided with a control device which is formed of a central processing unit (CPU) 44 connected to the keyboard 6, scanner 18, video tape recorder 22, and a printer 23, as shown in FIG. 4.

Figure 5:
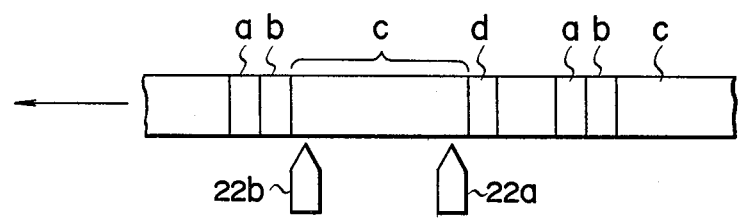
FIG. 5 shows a format of a magnetic tape in which document image information is recorded.

Now there will be described the operation of the recordable reader printer 1 of the aforementioned construction. First described will be a case where image information of the document is recorded in the video tape recorder 22. In such a recording mode, the tape cassette 19 is set in the video tape recorder 22 through the slot 20 of the subsidiary body 3, and the document is placed on the document table 4 and fixed by the cover 5. When a retrieval code is keyed in by means of the ten-key 8 of the keyboard 6 and the operation key 7 is operated, the CPU 44 gives to the video tape recorder 22 with a command to drive the recorder 22. At this time, the CPU 44 supplies a recording head $22a$ of the VTR 22 with a recording start signal and the retrieval code. Also, the CPU 44 gives a command to the scanner 18 to drive the scanner 18 in response to the operation of the operation key 7. When the scanner 18 is driven, the halogen lamp 13 lights up and the optical system 12 moves in a horizontal direction. In response to the movement of the optical system 12, the reflected light from the document is led to the solid state image pickup element 17, and thus the video signal corresponding to the image of the document is supplied from the solid state image pickup element 17 to the VTR 22. The VTR 22 records the recording start signal, retrieval signal and video signal in a magnetic tape 19a in the tape cassette 19, as indicated by symbols a, b and c in FIG. 5. On the other hand, a reproducing head 22b adjacent to the recording head 22a reproduces the recorded information and supplies a reproduced signal to the optical fiber cathode-ray tube 24. Then, the printer 23 is driven in response to a driving command from the CPU 44 to rotate the photoconductive drum 25. The surface of the photoconductive drum 25 is charged by the charger 26. When passing through the optical fiber cathode-ray tube 24, the charged surface of the photoconductive drum 25 is exposed to the light from the optical fiber cathode-ray tube 24, and an electrostatic latent image corresponding to the reproduced video signal is formed on the exposed surface. The electrostatic latent image is developed by the developer 27. At this time, one copy sheet P is delivered from the copy sheet cassette 28 to the sheet path 30 by means of the feed roller 29. The copy sheet P on the sheet path 30 is supplied to the transfer charger 32 by means of the carrier roller 31. The transfer charger 32 transfers to the copy sheet P an image developed by the developer 27 or a toner image corresponding to the document image.

As described above, the video signal of the document image is reproduced by the reproducing head 22b at the same time when it is recorded in the magnetic tape by the recording head 22a. The reproduced video signal is supplied to the optical fiber cathode-ray tube 24 of the electrographic printer 23, whereby it is reproduced as an optical image. When the recording and reproduction is thus performed and the whole image of the document is recorded, the CPU 44 supplies a recording over signal to the recording head 22a of the VTR 22, where the recording over signal is recorded in a recording region d next to the video signal recording region c and at the same time the scanner 18 is stopped and the optical system is returned to its original position. The reproducing head 22b reproduces remaining recorded video signals, and continues to supply the optical fiber cathode-ray tube 24 with reproduced signals. When the recording over signal is reproduced by the reproducing head 22b, the CPU 44 gives a stop command to the VTR 22 to stop the operations thereof.

When the toner image of the document is transferred to the copy sheet P in the electrographic printer 23, the copy sheet P is torn off the photoconductive drum 25 by the exfoliation charger 33, and led to the sheet path 34. The copy sheet P on the sheet path 34 is delivered to the fixer 27 by means of the carrier rollers 35 and 36, and the toner image is fixed to the copy sheet by the fixer 27. After the fixation, the copy sheet P is discharged into the tray 39 by the discharge roller 38. Meanwhile, the surface of the photoconductive drum 25 after the transfer is cleaned by the magnetic brush 41 of the cleaning device 40.

When the process for recording, as well as reproduction and printing, is finished, the printer 23 is stopped by a stop command from the CPU 44. An operator is supposed to check to see if the video signal recorded in the magnetic tape corresponds entirely to the image of the document by watching the image on the copy sheet discharged into the tray 39. If it is confirmed that the document image signal is recorded properly, recording as well as reproduction of the image of a subsequent document is performed. In doing this, a retrieval code for the new document is keyed in through the ten-key 8. Thereafter, the same operations as aforementioned are performed. Thus, a number of documents are recorded, and the recorded signal for each recording process is checked for correctness. A tape cassette that has undergone the recording is taken out through the slot 20 of the subsidiary body 3, and stored in the cassette receiving chamber $3_2$. In this case, the detection code, title, etc. of the recorded document are stated on the surface of the cassette, for example.

Now there will be described how a copy may be obtained of one of many document images recorded in the above-mentioned manner. In this case, when a retrieval code corresponding to the desired document information is keyed in through the ten-key 8, and e.g. a retrieval key of the operation key 7 is depressed, the CPU 44 is set to a retrieval mode. Then, the VTR 22 operates at high speed to read out the retrieval code recorded in the magnetic tape. The read retrieval code is compared with an input retrieval code by means of e.g. a comparator in the CPU 44. If the read retrieval code is coincident with the input retrieval code, the CPU 44 applies a reproduction command to the VTR 22. Thus, the VTR 22 reproduces a video signal corresponding to the desired document, and supplies the optical fiber cathode-ray tube 24 with the reproduced video signal. In accordance with the reproduced video signal, the printer 23 reproduces the document information or document image on a copy sheet in the same manner as the aforementioned printing step.

Thus, according to this invention, whether the recorded information is correct may be ascertained by performing reproduction and printing operations in concurrence with recording operation so that the recorded information may always be correct.

Figure 6:
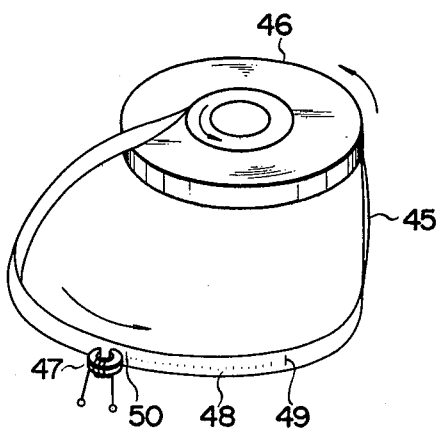
FIG. 6 is a perspective view of an endless magnetic tape used with the reader printer of FIG. 1.

Although in the above embodiment there are provided recording and reproducing heads, a magnetic head 47 for both recording and reproduction may be used in combination with an endless magnetic tape 45 as shown in FIG. 6. In this case, a recording portion of the tape reaches the recording/reproducing head 47 after completion of recording, and the electrographic printer 23 is operated by a command from the CPU 44 when a recording start signal is reproduced by the head 47, thereby printing out a document image corresponding to a recorded document information read by the recording/reproducing head 47 of the VTR 22. When a recording over signal recorded in the endless magnetic tape 45 is reproduced by the head 47, the CPU 44 gives the VTR 22 a reading stop command. After transferring and fixing all the document images corresponding to the recorded document information, the printer 23 discharges a copy sheet into the tray, and is stopped by a command from the CPU 44.

Further, although the recording start signal and recording over signal are generated from the CPU and recorded in the VTR according to the above embodiment, these signals may otherwise be encoded and recorded respectively in, for example, the forward and backward end portions of the document so that the encoded signals may be read by an optical system.

For the exposure device, moreover, a laser scanning device may be used instead of the optical fiber cathode-ray tube.

As for the recording medium used, furthermore, it is not limited to the video cassette tape, but may be a magnetic disc, optical memory disc, or a semiconductor memory or some other memory.

In the above embodiment, the recorded document image is checked for correctness by reproducing the document image signal from the scanner while it is being recorded in the magnetic tape. As long as the scanner is reliable, however, the document image signal from the scanner may as well be supplied to the printer for printing as be supplied to the VRT for recording.

According to the invention as described above, whether the document information or document image signal is recorded correctly from the document can be ascertained in concurrence with the recording operation, and the recording and checking operation may be performed with ease.

What we claim is:

1. A recordable reader printer comprising:
   a scanner for optically scanning each of a plurality of documents and producing document image information for the images of said individual documents;
   means for producing retrieval code information respectively corresponding to said documents;
   a recording/reproducing device including means for recording in a recording medium the document image information and retrieval code information corresponding to said documents respectively from said scanner and said retrieval code information producing means and a means for reproducing the recorded information from said recording medium;
   means for inputting a retrieval code information corresponding to desired one of said image information for said documents;
   means for detecting from said recording medium a document image information corresponding to the retrieval code information inputted by means of said retrieval code information input means and giving said recording/reproducing device a command for reproduction to read out the detected document image information from said recording medium; and
   an electrographic printer including a means for converting at least the document image information reproduced by said recording/reproducing device into an optical image corresponding to the image of said document and a means for converting the optical image into a printed image;
   said recording/reproducing device including means for reproducing the document image information and corresponding retrieval code information immediately when said information is recorded and supplying said reproduced information to said electrographic printer.

2. A recordable reader printer according to claim 1, wherein said scanner is composed of a light source to illuminate the document, and an image pickup element receiving a reflected light from the illuminated document and converting said light into a video signal corresponding to the image of said document.

3. A recordable reader printer according to claim 1, wherein said recording/reproducing device is formed of a video tape recorder including a recording magnetic head for recording the document image information from said scanner in said recording medium and a reproducing magnetic head adjacent to said recording magnetic head, whereby the recorded document image information is reproduced.

4. A recordable reader printer according to claim 1, 2 or 3, wherein said document image converting means of said electrographic printer is formed of an optical fiber cathode-ray tube to which the reproduced document image information from said recording/reproducing device is supplied.

5. A recordable reader printer according to claim 1, 2 or 3, wherein said electrographic printer includes a rotatable photoconductive drum, a first charger to charge said photoconductive drum, an exposure means for forming an electrostatic latent image corresponding to said optical image on the surface of said charged photoconductive drum, a developer to develop the electrostatic latent image into a toner image, a transfer means for transferring the toner image to a sheet, and a fixer to fix the transferred toner image.

6. A recordable reader printer according to claim 1, 2 or 3, wherein said recording/reproducing device is formed of a video tape recorder using an endless magnetic tape for said recording medium and performing recording and reproducing operations by means of a combined-use magnetic head.

* * * * *